March 30, 1965   D. FIRTH ETAL   3,175,354
HYDRAULIC TRANSMISSION SYSTEMS
Filed March 1, 1963   7 Sheets—Sheet 6

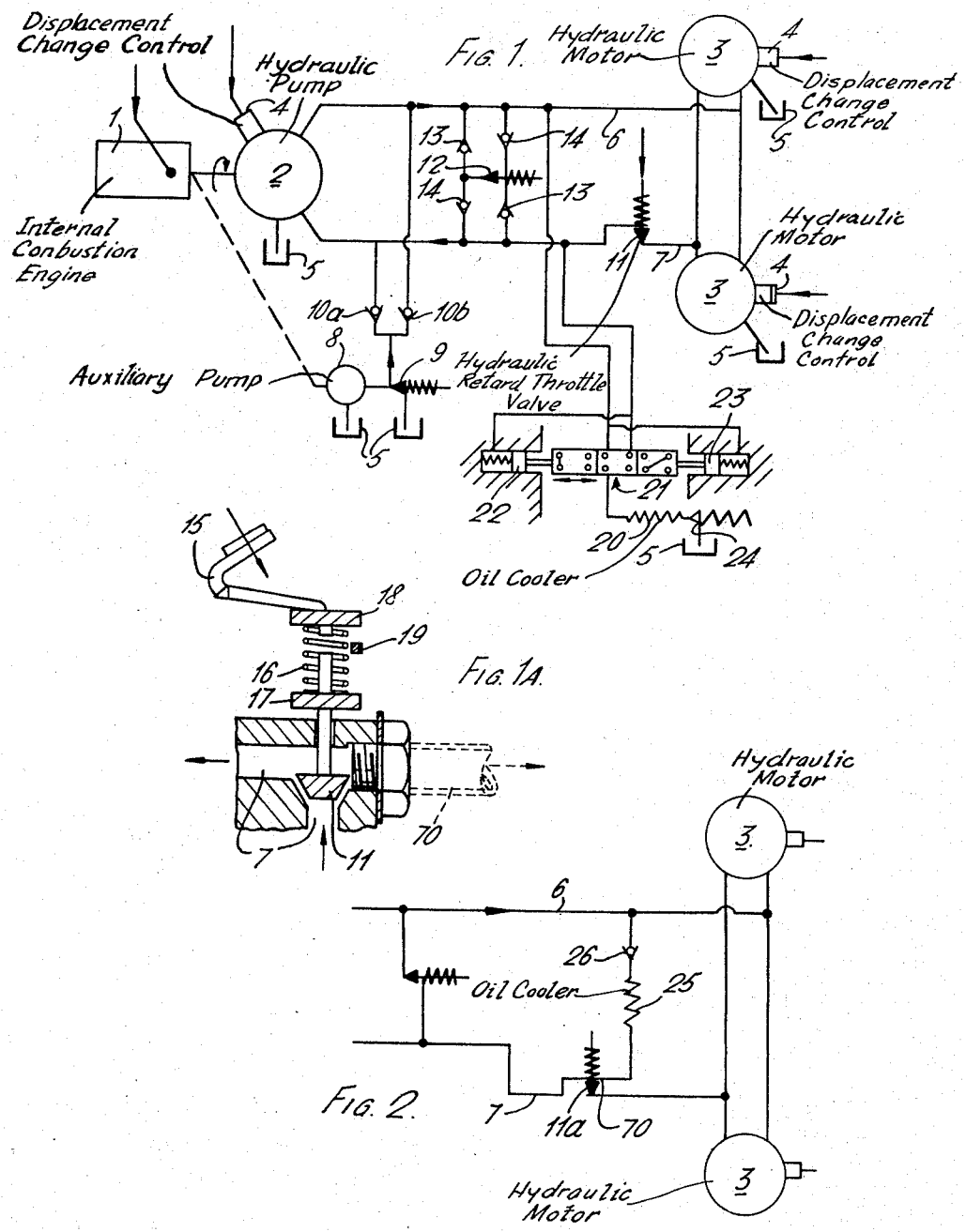

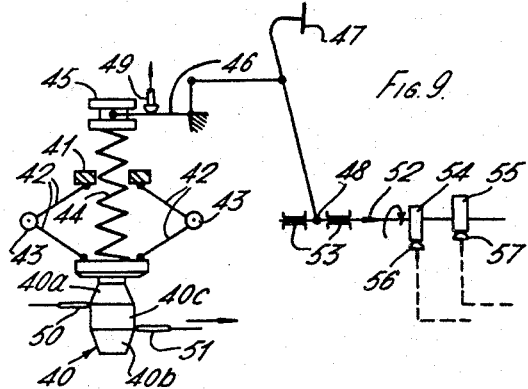
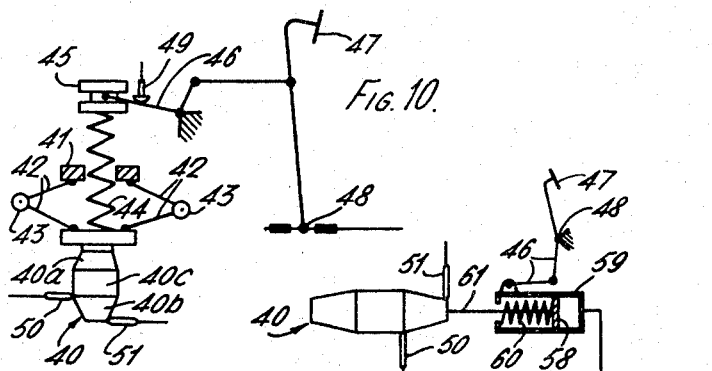
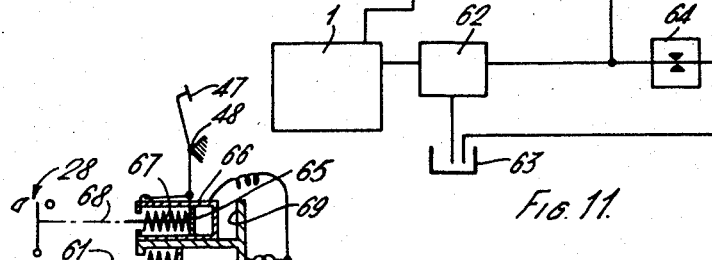
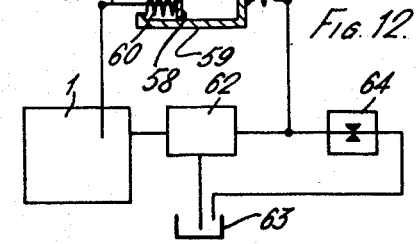

3,175,354
HYDRAULIC TRANSMISSION SYSTEMS
Donald Firth and Roger Harvey Yorke Hancock, East Kilbride, Glasgow, Scotland, assignors to Council for Scientific and Industrial Research, London, England, a body incorporated under the laws of the United Kingdom
Filed Mar. 1, 1963, Ser. No. 262,072
Claims priority, application Great Britain, Mar. 8, 1962, 9,029
16 Claims. (Cl. 60—19)

This invention relates to hydraulic transmission systems which are especially, although not exclusively, suitable for use in land vehicles powered by a prime mover such as an internal combustion engine.

The invention is primarily directed to relatively heavy vehicles such as public service vehicles, goods vehicles, or locomotives, although the principles are applicable to any situation where a prime mover is coupled to a variable load.

In land vehicles in particular, fluctuations in speed and load impose onerous operating conditions on any internal combustion engine which is mechanically coupled to the road wheels. Thus, a wide speed range is required with a torque characteristic which must not fall off too rapidly in the vicinity of maximum speed, and at the same time must remain as high as possible down to stalling speed. This means, in effect, that an internal combustion engine for vehicle propulsion can only operate effectively over a limited speed range, and consequently it has been hitherto usual to combine a stepped-ratio mechanical transmission and clutch mechanism with the prime mover in order to approximate as nearly as is economically practicable to the desired power output characteristics.

Hydraulic couplings of the so-called "torque converter" type are already in use in vehicles in conjunction with internal combustion power units but these couplings have certain disadvantages such as a marked loss of efficiency outside a limited working range. Furthermore, the torque/speed characteristic of a conventional internal combustion engine for vehicles requires the provision of a stepped ratio gearbox in the transmission, so that much of the theoretical efficiency of an hydraulic coupling is lost.

One disadvantage of some hydraulic couplings as hitherto applied to road vehicles is the difficulty and complication of providing "engine braking" on the over-run, which leads to excessive demands on the vehicle's conventional friction brakes in mountainous country.

It is an object of the present invention to provide a wholly hydraulic transmission with an infinite gradation of effective gear ratios over the desired range coupled with engine braking or its practical equivalent (herein termed "hydraulic retard").

Another object of the invention is to provide an hydraulic transmission which converts kinetic energy lost during hydraulic retard into hydraulic fluid pressure which is sorted and automatically made available for subsequent drive. For convenience of description, the hydraulic fluid used will be referred to in this specification as "oil," this term being deemed to include any liquid having the required physical and chemical characteristics.

Accordingly the present invention provides an hydraulic transmission system comprising a variable stroke positive displacement pump driven by the prime mover, a positive displacement hydraulic motor in circuit with the pump and coupled to a load, and hydraulic retard throttle means interposed in the normal low pressure side of the hydraulic circuit between the pump and the motor, and this may be ganged to the conventional driver-operated brake pedal or the accelerator pedal, or both, for the prime mover so that hydraulic back-pressure is exerted on the motor in proportion to the degree of deceleration dictated by the instantaneous position of the pedal or pedals.

Preferably, provision is made for cooling oil pumped by the motor against the action of the retard throttle means.

Conveniently, the retard throttle means is a spring-loaded mushroom or like valve biased to the closed position by a spring whose degree of compression is variable by a manual or pedal control. A stop may limit the degree of spring compression to be exerted by the control and hence to limit the maximum oil pressure which can be obtained from over-run pumping by the motor. Further travel of the pedal may be arranged to bring into operation the conventional braking system.

Advantageously, means is provided for storing oil under high pressure derived from the motor outlet circuit during braking periods, and for returning this high pressure oil to the pump inlet during a subsequent drive period. This storage means may include a high pressure oil accumulator, which may be preloaded to a predetermined minimum pressure, and a change-over valve having charge and discharge port connections, this valve being operated by the accelerator control of the prime mover so as to be set to the charge position when the accelerator is released.

When a pre-loaded high pressure accumulator is used, an automatic pressure-sensitive mechanism is included in the hydraulic circuit which operates to direct oil into the accumulator when the pumping pressure of the motors exceeds the accumulator pre-load pressure. For example, the retard throttle valve may be followed by an automatic pressure balance controlled valve which serves to return oil to the pump inlet—or a pump by-pass circuit—so long as the motor pumping pressure is below the accumulator pre-load pressure. As soon, however, as this is exceeded, the balance valve closes and all the motor discharge is fed to the accumulator until the prime mover accelerator is opened again to reverse the circuit connections at the change-over valve or until the accumulator becomes full.

Various practical embodiments of the principle of the invention will now be particularly described, by way of example only, with reference to the accompanying schematic drawings in which:

FIGURE 1 is a circuit diagram of a relatively simple hydraulic transmission circuit;

FIGURE 1A is a fragmentary sectional view of a simplified braking throttle valve and its control mechanism;

FIGURE 2 shows a modification of the circuit of FIGURE 1;

FIGURE 9 is a diagrammatic view of a braking throttle pedal and engine governor connecting linkage in the positions of rest of the parts;

FIGURE 10 is a view similar to FIGURE 9 showing the parts in their various positions when the vehicle is being accelerated, and FIGURES 11 and 12 show alternative modifications of the arrangement shown in FIGURES 9 and 10.

Throughout the drawings, like parts carry similar reference numerals.

Figure 3:
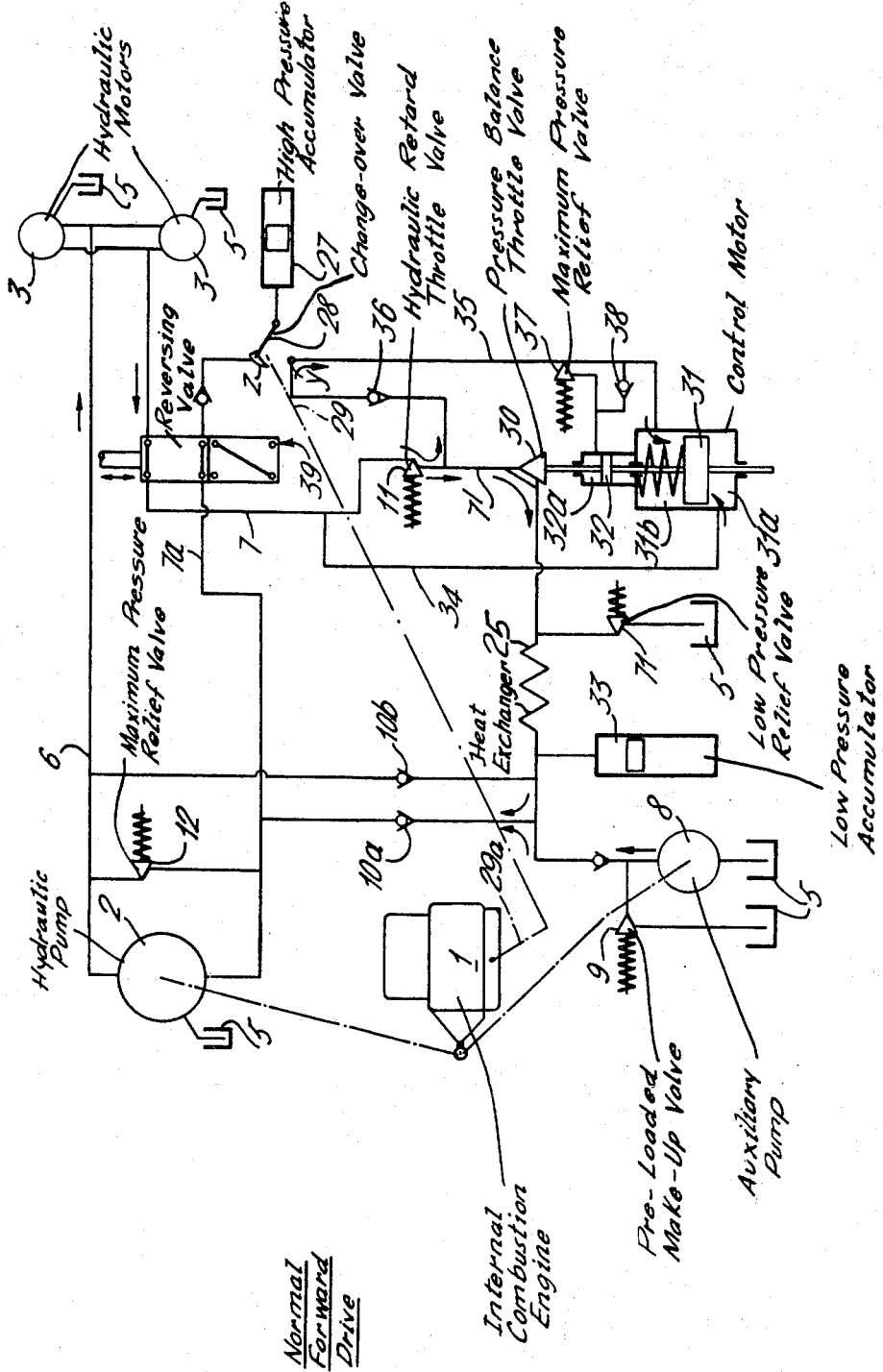
FIGURE 3 is a further modified arrangement of the circuit of FIGURE 1 incorporating provision for the storage of energy dissipated during braking.

FIGURE 1 shows a relatively simple hydraulic transmission system for transmitting the power output of an internal combustion engine 1—which is assumed to be a speed-governed compression ignition engine—to the road wheels (not shown) of a heavy road vehicle, or other load. The engine 1 drives a variable stroke positive displacement pump 2 (which may be a swash plate pump). The pump 2 is hydraulically coupled to a pair of similar variable stroke positive displacement motors 3 connected in parallel and each driving a road wheel. Both the pump 2 and the motors 3 have displacement-change controls indicated schematically at 4 and oil leakage drains to a reservoir indicated schematically at 5. The former constitute the equivalent of ratio-change controls in a conventional gearbox transmission, whilst the latter preferably incorporate a heat exchanger.

The hydraulic transmission circuit between the pump 2 and the motors 3 consists basically of a pair of flow and return lines 6, 7 respectively, the line 6 being regarded, for convenience of description, as the high pressure line and the line 7 as the low pressure line for forward drive. It will be understood, however, that on over-run, when the motors 3 act as pumps and drive the pump, and in reverse "gear," these roles will be interchanged.

The engine 1 also drives an auxiliary pump 8 for making up losses in the hydraulic circuit, this pump feeding oil, through a pre-loaded valve 9 and non-return valves 10a, 10b to the lines 6, 7.

An hydraulic retard throttle valve 11 is connected between the motors 3 and the pump 2 in the normal low pressure line 7, whilst a maximum pressure relief valve 12 for the hydraulic circuit is connected through pairs of non-return valves 13, 14 between the lines 6, 7. The arrangement is such that, if the pressure difference between the lines 6, 7 exceeds a predetermined working maximum, the valve 12 opens and provides a by-pass, either through the circuit 13–12–13 or 14–12–14, as the case may be.

The hydraulic retarded throttle valve 11 is controlled by a brake pedal—indicated at 15 in FIGURE 1A—which may also be coupled to the conventional friction brakes of the vehicle and which acts on the valve head 11 through a helical compression spring 16 located between opposed abutment pads 17, 18, and the one fixed on the valve stem and the other on the free end of the pedal. The spring rate is predetermined with reference to the operating parameters of the hydraulic transmission, and a limit stop 19 prevents over-compression of the spring. The effect of increasing the compression of the spring 16 by depressing the brake pedal 15 is to increase the back pressure in the exhaust line 7 from the motors 3, the pressure limit represented by the position of the stop 19 being of the order of 2000 lb./in.$^2$. This throttling increases the load on the pump 2, and the engine 1 is accordingly slowed.

Another effect of throttling the hydraulic circuit at the retard throttle valve 11 is to increase the temperature of the oil in the hydraulic circuit. An oil cooler 20 is therefore provided for cooling a proportion—say, 10%—of the oil flowing through the motors 3. The cooler is fed from either the line 6 or the line 7, depending on which one happens to be the low pressure line at any given instant, through a change-over spool valve 21 which is spring biased to a central cut-off position and is moved to either of its two limit positions by a pair of opposed single-acting piston or diaphragm servos 22, 23 each connected to a respective line 6, 7 of the working circuit. The valve is moved whenever there is a change in the direction of the pressure difference between the lines, and is arranged to automatically connect the low pressure line to the cooler.

The exhaust from the cooler 20 is passed through a spring-loaded valve 24 set to open at a minimum pressure which ensures that the working circuit 2, 3, 6, 7 is always full of oil, and is fed back into the working circuit by the make-up pump 8, which also returns—preferably through a cooler (not shown)—the leakage oil which is collected from various components of the transmission system by the collectors 5.

FIGURE 2 illustrates a modification of the hydraulic circuit of FIGURE 1 by which the engine 1 and pump 2 are enabled to idle during "over-run" when the motors provide a measure of braking by being made to pump oil. In this modification, the retard throttle valve 11a has a second outlet 70 (see also FIGURE 1A) connected to a by-pass loop or shunt circuit comprising an oil cooler 25 and a non-return valve 26. The fuel injection rack (not shown) of the engine 1 may be connected to the brake pedal 15 (FIGURE 1A) in the sense for reducing engine speed progressively as the pedal is depressed.

In operation, when the accelator pedal is released, the vehicle free-wheels. Then braking is achieved, as before, by partially closing the valve 11a. A reverse pressure difference is now established across the non-return valve 26 in the shunt circuit, and oil pumped by the motors 3 is circulated through the throttle valve 11a and shunt cooler 25.

The equivalent action, from the driver's point of view, to selecting conventional "engine braking" can be obtained by interlinking the prime mover accelerator pedal and the valve 11a so that the latter is allowed to close partially when the driver releases the accelerator.

FIGURE 3 shows a further modification of the hydraulic circuit of FIGURE 1 which includes a high pressure accumulator for storing some of the energy derived from hydraulic retardation and for feeding this energy back into the circuit on subsequent drive. The high pressure accumulator 27 is coupled through a change-over valve 28 linked at 29 to a control member 29a of the accelerator linkage or fuel pump rack (not shown) on the prime mover 1. This valve has two positions, marked y and z in FIGURE 3, position y being the accumulator charging position and position z the energy feed-back or discharging position. In the latter, the valve aperture is normally fully open, but in order to cater for low load conditions it is made variable so that the rate of energy feed-back can be a function of the prime mover speed governor, which in turn is controlled by the accelerator position so as to give controlled acceleration of the motors 3.

The feed of oil to the high pressure accumulator 27 is governed by an automatic pressure balance throttle valve 30. This valve is controlled by a double-chamber positive displacement motor consisting of a double-piston spool having main and auxiliary piston lands 31, 32 respectively. The valve 30 is in series with the throttle valve 11 in the "forward" normal running low pressure line 7. This line includes a heat-exchanger 25, between which and the pump 2 is located the tee-off connection for a low pressure accumulator 33. A low pressure full flow relief valve 71 is also teed into the circuit adjacent the cooler 25 to return excess oil to the reservoir 5.

On either side of the main piston 31 of the pressure balance spool are opposed pressure chambers 31a, 31b, the chamber 31a being connected through a duct 34 to the line 7 upstream of the throttle valve 11. The pressure in the chamber 31a is thus always the "pumping" pressure of the motors 3. The chamber 31b is connected by a duct 35 to the portion 7' of the low pressure line 7 between the valves 11 and 30, the connection being made through a non-return valve 36 set to pass the normal "pumping" flow of the motors 3 and thus to maintain a working pressure in the duct 35 which feeds the chamber 31b. Above the auxiliary piston 32, a chamber 32a is connected to the duct 35 through a pressure relief valve 37 set to open at the required maximum pressure in the accumulator 27. A non-return valve 38 allows oil trapped in the chamber 32a to escape.

Under normal drive conditions, therefore, the pressure across the main piston 31 is balanced and the automatic throttle valve 30 is open, the action of the pressure balance spool 31, 32 making the automatic valve 30 function as a follow-up of the main throttle valve 11. Thus, if the latter is partially closed, the pressure drop across it increases, and the equilibrium of the piston 31 is correspondingly disturbed. The spool thus tends to close the valve 30, but as the latter constricts the flow further, the pressure drop across the valve 11 falls and pressure in the duct 35 rises, and hence the pressure in the chamber 31b rises to balance that in the chamber 31a and the automatic valve 30 assumes a new balance position. A very light bias spring is incorporated in the valve 30 to bias the valve open. This is necessary to prevent the valve from locking itself closed—for example, if the valves 30 and 11 were closed and the valve 11 were opened quickly, the pressure on either side of the piston 31 would be equal and the valve 30 would remain closed. Instead of using a bias spring the effective area on either side of the piston 31 could be made slightly different.

A reversing valve 39 cuts out the retard and automatic throttle valves 11, 30 and associated hydraulic circuits. The vehicle is thus accelerated and driven in reverse by the prime mover 1 without the aid of any stored energy from hydraulic retard. Braking in reverse is achieved by the conventional friction braking system.

FIGURE 3 illustrates the conditions under normal forward drive conditions. The accelerator pedal is partly depressed and the engine rack connection 29 has set the change-over valve 28 to a normal running position with the high pressure accumulator 27 fully open through the discharge port z to the return line 7a. Both the retard and the automatic throttle valves 11, 30 are open, and the accumulator 27 has discharged all its oil under pressure, so that no flow takes place along the pump return circuit 7a. All the low pressure oil passes from the motors 3 via the reversing valve 39, line 7, retard and automatic throttles 11, 30, cooler 25 and appropriate non-return valve 10a or 10b.

Figure 4:
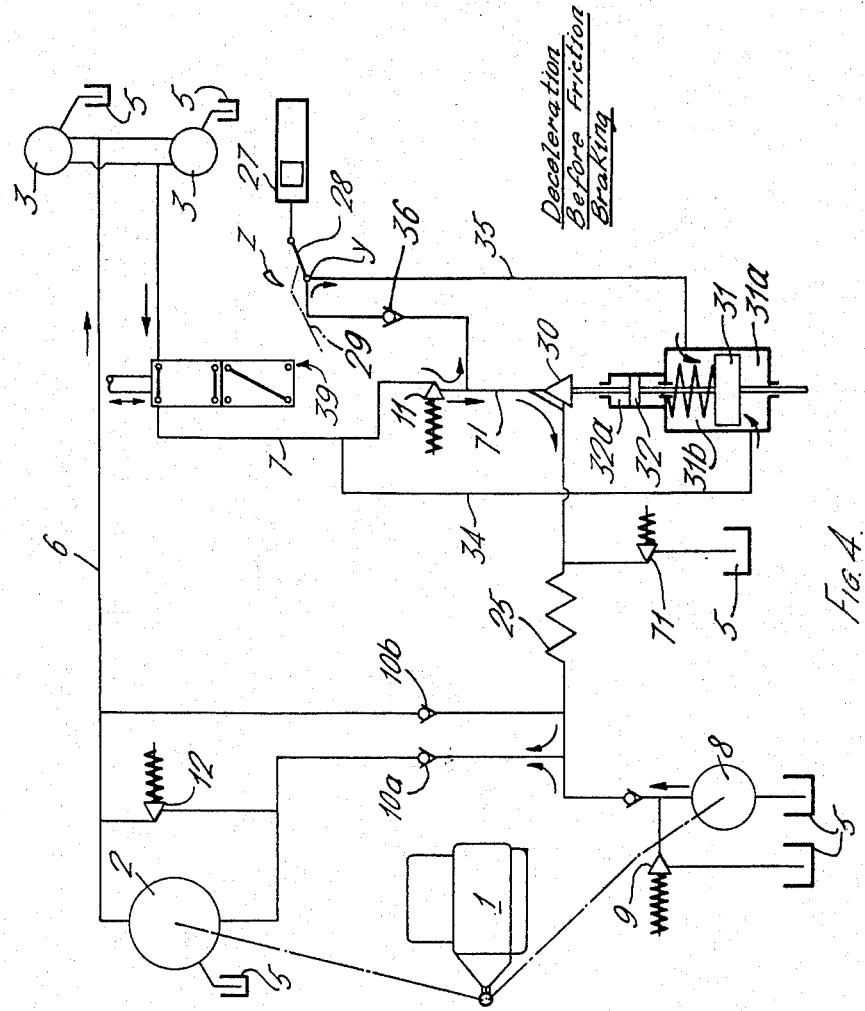
FIGURES 4–6 are diagrams showing those parts of the circuit of FIGURE 3 which are operative at different stages in a braking and subsequent acceleration sequence.

If now the accelerator pedal is lifted to check vehicle speed, partial closure of the retard throttle valve 11 occurs, and the connections are as shown in FIGURE 4. The resultant rack movement changes over the valve 28 so that the high pressure accumulator 27 is connected to the duct 35, which transfers the pressure in the low pressure line 7' between the throttle valves 11 and 30 to the balancing chamber 31b. The engine 1 is idling and the motors 3 begin to pump oil round the circuit via the non-return valves 10a and 10b. The valve 10b carries the excess which cannot be accepted by the pump 2 under no-load idling conditions.

No oil is pumped through the charge port y of the valve 28 into the high pressure accumulator 27 at this stage as the latter is pre-loaded (e.g. with compressed air) to a pressure above that achieved in the ordinary over-run conditions. A pre-load pressure of about 500 lb./in.² is envisaged as a fairly representative value.

If after release of the accelerator pedal the brake pedal is now depressed to give positive hydraulic retard, the throttle valve 11 is closed further since it is controlled by the brake pedal as shown in FIGURE 1A. The pressure in the line 7 rises and is transferred by the connection 34 to the chamber 31a. At the same time pressure in the line 7' between the valves 11 and 30 tends to be lower than in the line 7. The automatic spool 31, 32 thus begins to close the automatic throttle 30, and in doing so causes a rise in pressure at the non-return valve 36 which is immediately transferred by the duct 35 to the chamber 31b and the spool is rebalanced.

Figure 5:
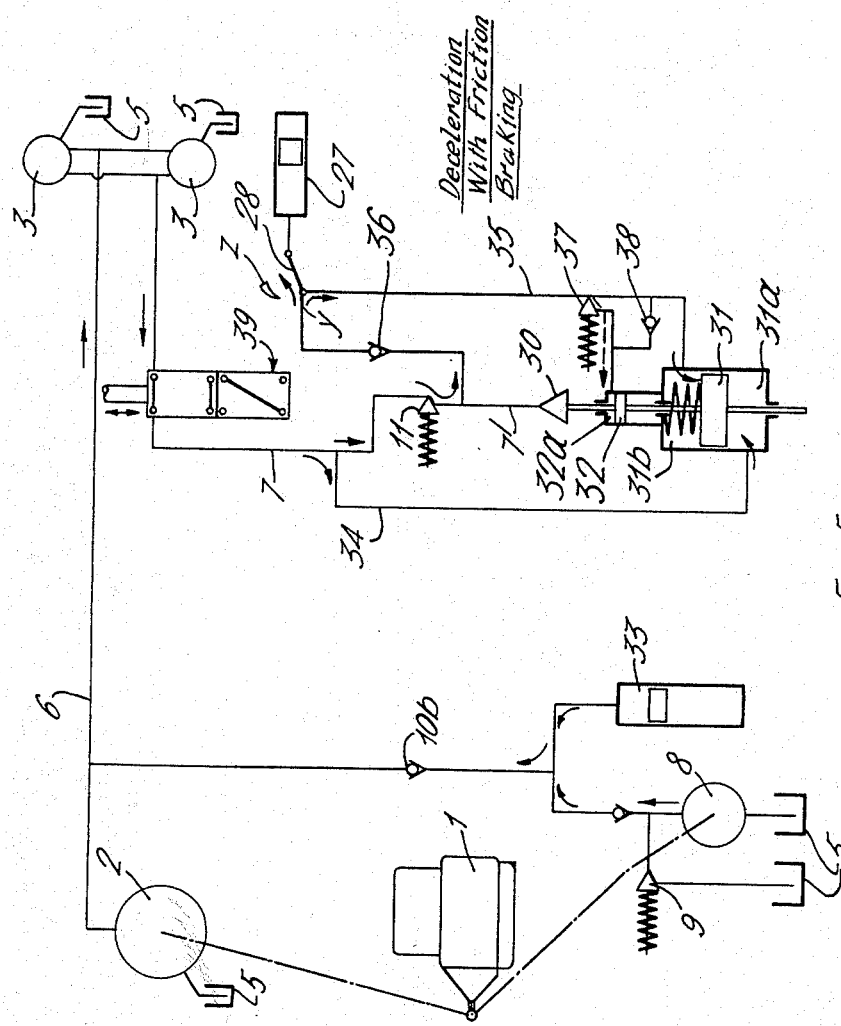

Under positive hydraulic retard the pressure in the duct 35 rises until the value of pre-load pressure in the high pressure accumulator 27 is reached. At this point (FIGURE 5) oil which is still being passed by the retard throttle valve 11 to balance the spool 31, 32 via the non-return valve 36 is diverted to the high pressure accumulator 27. Hence the pressure in the chamber 31b remains constant at the accumulator charging pressure whilst the pressure in the chamber 31a rises further. The valve 30 is therefore kept closed. When, however, pressure in the duct 35 exceeds a designed maximum, oil at this pressure unseats the pressure relief valve 37 leading to the chamber 32a and so acts on the auxiliary piston 32 to reopen the valve 30. The further supply of oil to the accumulator 27 thus ceases.

During this period the low pressure accumulator 33 discharges to make up for oil fed to the high pressure accumulator 27. It should be noted that the throttle valve 30 will also open at an intermediate point if the pressure in line 35 approaches the pressure in the line 7, i.e., when the required rate of retard is achieved.

Figure 6:
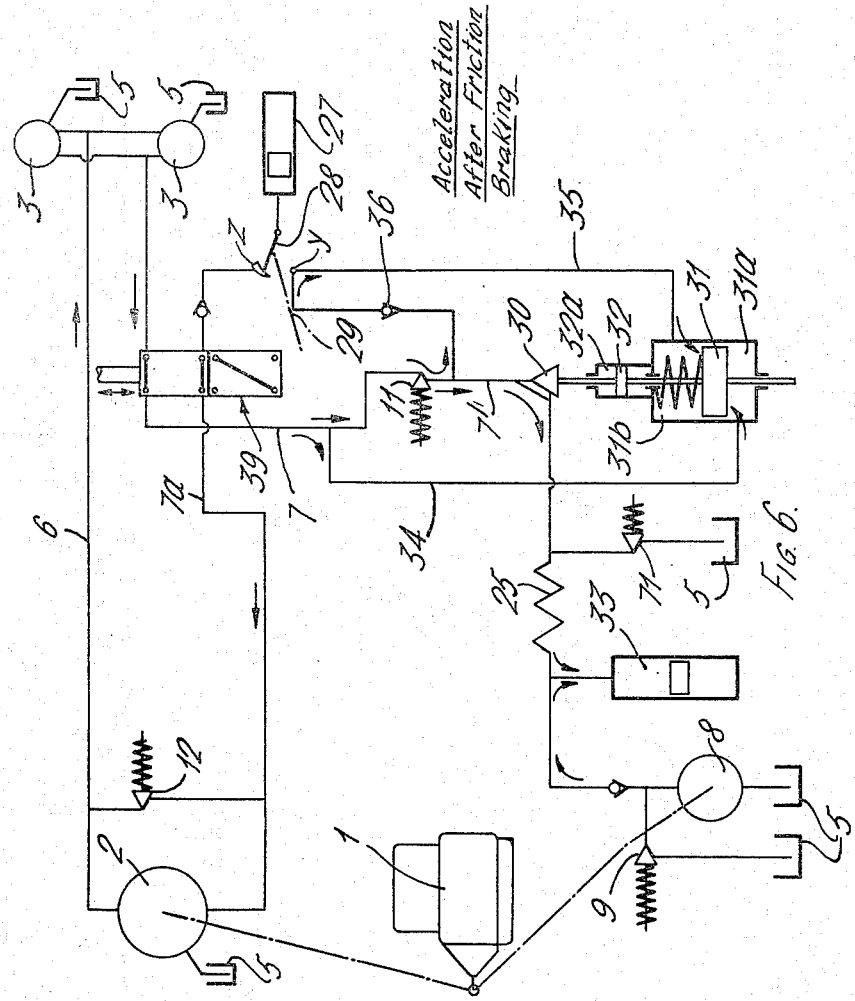

With the accumulator 27 thus charged, the action of the transmission on subsequent depression of the accelerator pedal (while the vehicle is still moving) is as follows (FIGURE 6):

First, the rack link 29 operates the change-over valve 28.

Then, with the discharge port z fully open, high pressure oil is fed from the accumulator 27 via the return oil line 7a to the pump 2 and hence to the motors 3, thus pre-charging the pump 2. This has the effect of diminishing the power required from the engine 1 to raise the presure in the line 6. Thus additional energy for acceleration can be provided until the accumulator 27 is fully discharged.

If the accumulator 27 now delivers more power than is called for by the accelerator pedal position—e.g. under light load conditions—the pump 2 would tend to overspeed the prime mover 1. The engine speed governor therefore sufficiently closes the variable aperture port z to reduce the output from the accumulator 27 and thus reduce the power fed back from the pump 2 to the prime mover 1.

At the same time, the balance spool 31, 32 resumes its normal running operation and the value 30 opens. However, the pressure in the return line 7a is greater than in the line 7 and the oil cooler 25, so that the non-return valves 10a, 10b are closed. Oil therefore recharges the low pressure accumulator 33, and as soon as it is fully charged, excess oil is by-passed through the relief valve 71 to the reservoir 5.

Figure 7:
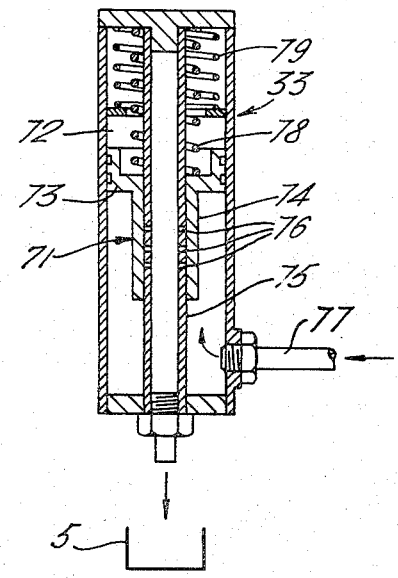
FIGURES 7 and 8 are axial sections of detail constructions.

FIGURE 7 shows a construction of low pressure accumulator 33 which incorporates the relief valve 71. In this construction, an accumulator cylinder 72 houses an annular piston 73 with integral tubular skirt 74 which is a close sliding fit on a central tube 75. This tube is sealed at one end and communicates with the reservoir 5 at its other end. The tube is pierced by a number of ports 76 which, when the accumulator is discharged or only partly charged, are blanked off by the tubular skirt 74, and are only opened to the space within the cylinder 72 when the accumulator reaches its fully charged condition.

The cylinder 72 communicates with the line 7' and the oil cooler 25 through an inlet connection 77 below the annular piston 73. Above the piston are located two compression loading springs 78, 79, both of which abut at their upper ends against the closed end of the cylinder 72. The loading spring 78 is the longer of the two and acts on the piston 73 for the whole of its working travel. The spring 79 is only engaged by the piston 73 as it approaches the limit of its charging travel, and controls the opening of the ports 76 by the lower end of the skirt 74.

The accumulator operates as follows:

Any pressure in the oil cooler 25 is directly communicated to the cylinder 72 and tends to displace the piston 73 against at least the loading spring 78. As the quantity of oil introduced into the working circuit 6, 7 increases during discharge of the high presure accumulator 27, pressure builds up in the cylinder 72 and the piston 73 is driven up against the loading springs 78, 79 until the accumulator is full. At this point, any further injection of oil causes the piston skirt 74 to uncover the ports 76 and by-pass the oil to the reservoir 5. The pressure at which this occurs is slightly greater than the normal delivery pressure of the make-up pump 8.

Figure 8:
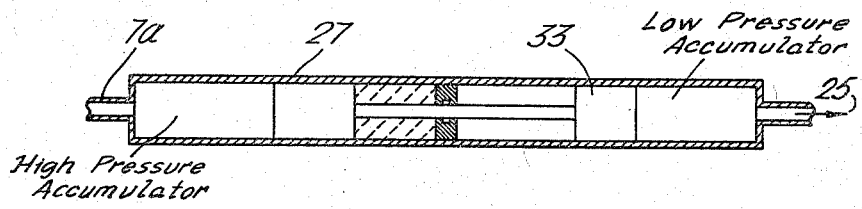

FIGURE 8 illustrates schematically another arrangement of low pressure accumulator 33 in which it is placed back-to-back with the high pressure accumulator 27, with the pistons of the two accumulators rigidly interconnected for displacement in unison. This ensures that the low pressure accumulator 33 presents at all times exactly the correct capacity to absorb the extra oil injected into the working circuit 6, 7 during discharge of the high pressure accumulator 27, and also that it feeds into the working circuit the quantity of oil required to charge the high presure accumulator 27 during hydraulic retard. In a slightly modified form (not illustrated) of the arrangement shown in FIGURE 8, the accumulators 27, 33, are located side-by-side and their pistons are interconnected by a centrally pivoted lever which ensures that they move equally and in opposite directions.

FIGURES 9 and 10 illustrate schematically, and in different control position, a form of single pedal control linkage for combining the functions of the conventional accelerator pedal, the pedal for controlling the retard throttle valve 11, the engine governor, and the high pressure accumulator charge/discharge change-over valve 28.

A barrel cam 40 is driven by the engine 1 (FIGURES 1-6) through a splined shaft (not shown) which also carries the top ring 41 to which the upper ends of the governor weight links 42 are pinned. The weights 43 are controlled by a helical compression spring 44 located between the barrel cam 40 and a variable abutment collar 45 movable along the axis of the shaft under the control of a fork and bell-crank linkage 46 from a throttle pedal 47 pivoted at 48. The control for varying the loading on the spring of the retard throttle valve 11 is derived from a plunger 49 which bears on the collar 45 or on the fork 46 which operates it. The plunger is biased by the spring on the valve 11 to maintain contact with the collar or fork.

Two followers 50, 51 engage the barrel cam 40. The follower 50 controls the fuel injection pump control rack, and works over the upper cone 40a of the cam. The follower 51 operates the accumulator change-over valve 28 (FIGURES 3-6) and works over the lower cone 40b. When the accelerator pedal 47 is in its slow position, as shown in FIGURE 10, the rack follower 50 is at the top of the lower cone 40b, and the valve follower 51 is at the bottom of the cone. The fuel pump rack is then in its idle position and the accumulator valve 28 is in the charge position $y$ in FIGURES 3-6.

If the accelerator pedal 47 is depressed a little, the compression of the spring 44 forces the barrel cam 40 down to move the follower 51. This changes over the valve 28 and begins to open the port $z$. Thus the circuit is precharged at high pressure from the accumulator. If the pump 2 is at no-stroke, nothing will happer, since a pump in the no-stroke condition acts effectively as a closed valve. If, however, the pump is stroking, then the precharge pressure tends to accelerate both the pump and the motors. The engine 1 does not introduce more energy into the system. The rack 50 would in any case ride on the cylindrical central section 40c of the barrel cam 40. Further depression of the accelerator pedal 47 eventually brings the valve follower 51 to the crest of the cone 40b, when the discharge port $z$ of the change-over valve 28 is fully open, and the rack follower 50 onto the cone 40a so that it begins to move the rack and speed up the engine 1. The engine can then introduce more energy into the system depending on the power required at the wheel. In any case the power required from the engine is reduced for as long as the high pressure accumulator 27 can discharge. The relative phasing of the two followers will be determined by the operating characteristics required on the complete system.

As the engine 1 speeds up, the weights 43 tend to lift the cam 40 so as to "close" the rack. Further movement of the cam 40 causes partial closure of the port $z$ so as to reduce the boost from the high pressure accumulator 27. The system stabilises itself for each pedal position.

FIGURE 9 also illustrates a method of control of the strokes of the pump 2 and motors 3 which is added to the other functions of the accelerator, although it is not envisaged that this would necessarily be used in a road vehicle. In the drawing, the pivot 48 for the pedal is mounted on a horizontal shaft 52 carried in bearings 53. On the shaft are secured two cams 54, 55 engaged by followers 56, 57 respectively. The followers operate remote control servos at the pump 2 and the motors 3 which effect changes in the angle of a swash plate or the eccentricity of a ball track, according to the type of machine concerned. Thus, by swinging the pedal 47 away from a zero position, the "gear ratio" of the hydraulic machines is changed. Such a control might be incorporated in a manual accelerator on a rail vehicle, but the preferred method of control of the "gear ratio" is an automatic system sensitive to speed and load, and operating to give maximum fuel economy, or to satisfy some other desired condition.

FIGURES 11 and 12 show alternative methods of control of the engine fuel pump rack and the change-over valve 28. In FIGURE 11, the axial displacement of the barrel cam 40 is controlled by an hydraulic piston 58 working in a cylinder 59 against a return spring 60. The piston rod 61 carries the cam 40, and the piston is displaced against its return spring by oil pressure derived from an engine driven gear pump 62 the output flow of which is proportional to engine speed. The pump 62 draws oil from a sump 63 and returns it thither through a fixed orifice 64 to produce a pressure output proportional to engine speed. The position of the cylinder 60 is controlled by the linkage 46 connected to the pedal 47. This arrangement has the advantage over that shown in FIGURES 9 and 10 that more power is available for actuation of the cam 40, which is also not required to rotate and can therefore be a flat plate.

In FIGURE 12, the followers 50, 51 of FIGURES 9-11 are replaced by direct-acting piston rods 61, 68 each operated by a respective hydraulic piston motor 58, 59, 60 or 65, 66, 67. The cylinder 59 is mounted with limited freedom to slide, on the cylinder 66, a stop 69 defining the limit of relative sliding motion under increasing pressure on the pedal 47. Further pressure beyond this point displaces both cylinders together. Both cylinders 59, 66 are hydraulically connected in parallel to the output of the engine driven gear pump 62, the remainder of the control system being as shown in FIGURE 11. The arrangement ensures that the valve 28 is operated before the rack is moved when accelerating from idling speed.

In FIGURES 11 and 12, the gear pump 62 and orifice 64 may be replaced by any other hydraulic unit whose output pressure is related to engine speed by a desired law. An equivalent electrical circuit including a tachogenerator, solenoid and variable electrical load may be substituted as will be understood.

Although in the above description, with particular reference to FIGURES 1 to 6, of a transmission for a vehicle it has been assumed that hydraulic retard on over-run will be required in one direction of drive only, it is to be understood that this facility may be provided in both directions of drive if desired, the design of the connections of the reversing valve 39 being appropriately modified. A typical example of such an application is a locomotive which may be required to travel in either direction when hauling a load.

We claim:

1. An hydraulic transmission system for interconnecting a prime mover and a load comprising a variable stroke positive displacement pump adapted to be driven by said prime mover; a positive displacement hydraulic motor adapted to drive said load; hydraulic fluid connections between said pump and said motor; an adjustable hydraulic retard throttle valve interposed in an exhaust circuit of said motor; a driver-operated speed controller for said prime mover, and means interconnecting said speed controller and said throttle valve for adjusting the throttle action of said hydraulic retard valve when said speed controller is moved to a lower speed setting.

2. An hydraulic transmission system for interconnecting a prime mover and a load comprising a variable stroke positive displacement pump adapted to be driven by said prime mover; a positive displacement hydraulic motor adapted to drive said load; hydraulic fluid connections between said pump and said motor; an adjustable hydraulic retard throttle valve interposed in an exhaust circuit of said motor; a driver-operated device for controlling the speed of said load, and a resilient connection between said device and said retard valve for biasing said valve to the closed position on over-run.

3. An hydraulic transmission system for interconnecting a prime mover and a load comprising a reversible variable stroke positive displacement pump; a reversible positive displacement motor; an hydraulic circuit interconnecting said pump and said motor; a retard throttle valve; a reversing valve for connecting a port of said motor alternatively to the delivery side of said pump direct and to the inlet side thereof through said retard valve; means for controlling the speed of said load, and an interconnection between said speed control means and said retard valve for urging the latter to the closed position as the former is moved to a lower setting.

4. An hydraulic transmission system for interconnecting a prime mover and a load comprising a variable stroke positive displacement pump adapted to be driven by said prime mover; a positive displacement hydraulic motor adapted to drive said load; hydraulic fluid connections between said pump and said motor; an adjustable hydraulic retard throttle valve interposed in an exhaust circuit of said motor; means for controlling the throttle action of said retard valve during over-run of said motor; a high pressure accumulator for storing oil under pressure, and change-over valve means for selectively feeding oil under pressure from said retard valve to said accumulator or connecting said accumulator to the inlet of said pump.

5. An hydraulic transmission system according to claim 4 including a speed controller for said prime mover and a connection between said change-over valve and said speed controller for moving said change-over valve to an accumulator charge position when said controller is moved to decelerate said load and for moving said change-over valve to an accumulator discharge position when said controller is moved to accelerate said load.

6. An hydraulic transmission system according to claim 5 wherein the discharge port of said change-over valve is graduated in aperture.

7. An hydraulic transmission system for interconnecting a prime mover and a load comprising a variable stroke positive displacement pump adapted to be driven by said prime mover; a positive displacement hydraulic motor adapted to drive said load; hydraulic fluid connections between said pump and said motor; an adjustable hydraulic retard throttle valve interposed in an exhaust circuit of said motor; means for controlling the throttle action of said retard valve during over-run of said motor; an automatic throttle valve in series with said retard valve on the low pressure side thereof; pressure balance actuating means for controlling said automatic valve in response to the pressure drop across said retard valve; a high pressure accumulator for storing oil under pressure, and change-over valve means for selectively feeding oil under pressure from said retard valve to said accumulator or connecting said accumulator to the inlet of said pump.

8. An hydraulic transmission system according to claim 7 wherein said automatic valve actuating means comprises a double-spool hydraulic motor, said spool having a pair of piston lands of different diameters; hydraulic connections from opposite sides of the larger piston land to opposite sides of said retard throttle valve in the sense for closing said automatic valve with increase of pressure drop across said retard valve; and a connection from said high pressure accumulator charge port to one side of the smaller piston land in the sense for opposing closure of said retard valve at the maximum.

9. An hydraulic transmission system for interconnecting a prime mover and a load comprising a variable stroke positive displacement pump adapted to be driven by said prime mover; a positive displacement hydraulic motor adapted to drive said load; hydraulic fluid connections between said pump and said motor; an adjustable hydraulic retard throttle valve interposed in an exhaust circuit of said motor; means for controlling the throttle action of said retard valve during over-run of said motor; a high pressure accumulator for storing oil under pressure; change-over valve means for selectively feeding oil under pressure from said retard valve to said accumulator or connecting said accumulator to the inlet of said pump; a reservoir for excess oil, and a pressure relief valve between the accumulator charging circuit and the reservoir.

10. An hydraulic transmission system for interconnecting a prime mover and a load comprising a variable stroke positive displacement pump adapted to be driven by said prime mover; a positive displacement hydraulic motor adapted to drive said load; hydraulic fluid connections between said pump and said motor; and adjustable hydraulic retard throttle valve interposed in an exhaust circuit of said motor; means for controlling the throttle action of said retard valve during over-run of said motor; a high pressure accumulator for storing oil under pressure; change-over valve means for selectively feeding oil under pressure from said retard valve to said accumulator or connecting said accumulator to the inlet of said pump; a low pressure accumulator connected to the discharge circuit of said retard valve, and means for supplying oil from said low pressure accumulator to the inlet of said pump.

11. An hydraulic transmission system according to claim 10 including a reservoir for excess oil; a pressure-limiting by-pass valve connected between the input to said low pressure accumulator and said reservoir, and non-return valve means between said low pressure accumulator and the pump inlet.

12. An hydraulic transmission system according to claim 11 wherein said low pressure accumulator comprises a closed-ended cylinder; an outlet tube extending axially of said cylinder and opening to said reservoir through one closed end thereof; by-pass ports in the wall of said tube intermediate its length within said cylinder; an annular piston slidable within said cylinder and having a skirt which is an oil-tight fit over said axial tube, said skirt being adapted to uncover said by-pass ports adjacent the limit of travel of said piston in the full state of said accumulator; a spring for urging said piston in the discharge direction, and an inlet connection to said cylinder adjacent the discharge end of said cylinder.

13. An hydraulic transmission system according to claim 12 wherein a second and shorter spring is located within said cylinder for engagement by said piston towards the limit of travel thereof in the full state of said accumulator for controlling the opening of said by-pass ports.

14. An hydraulic transmission system according to claim 11 in combination with an auxiliary oil make-up pump adapted to be driven by said prime mover and connected between said reservoir and the inlet of said positive displacement pump.

15. An hydraulic transmission system according to claim 10 wherein each accumulator includes a pre-loaded piston which is displaceable by the oil fed to the accumulator, and said pistons are interconnected for differential displacement so as to maintain the volume of oil stored in the accumulators constant.

16. An hydraulic transmission system according to claim 15 wherein said accumulators are constituted by coaxial cylinders of equal diameter, and said pistons are rigidly interconnected for simultaneous displacement.

References Cited by the Examiner
UNITED STATES PATENTS

| | | | |
|---|---|---|---|
| 2,238,061 | 4/41 | Kendrick | 60—52 X |
| 2,285,069 | 6/42 | Vickers | 60—52 |
| 2,558,976 | 7/51 | O'Leary | 60—54 |
| 2,972,224 | 2/61 | Forster | 60—19 |
| 3,093,946 | 6/63 | Pitt et al. | 60—19 X |

JULIUS E. WEST, *Primary Examiner*.

EDGAR W. GEOGHEGAN, *Examiner*.